(12) United States Patent
Seller et al.

(10) Patent No.: US 10,305,535 B2
(45) Date of Patent: May 28, 2019

(54) LOW COMPLEXITY, LOW POWER AND LONG RANGE RADIO RECEIVER

(71) Applicant: Semtech Corporation, Camarillo, CA (US)

(72) Inventors: Olivier Bernard André Seller, Sainte Soulle (FR); Nicolas Sornin, La Tronche (FR)

(73) Assignee: Semtech Corporation, Camarillo, CA (US)

( * ) Notice: Subject to any disclaimer, the term of this patent is extended or adjusted under 35 U.S.C. 154(b) by 3 days.

(21) Appl. No.: 15/620,364

(22) Filed: Jun. 12, 2017

(65) Prior Publication Data
US 2018/0006680 A1  Jan. 4, 2018

(30) Foreign Application Priority Data

Jul. 1, 2016  (EP) ..................................... 16177425

(51) Int. Cl.
*H04B 1/69*  (2011.01)
*H04L 27/26*  (2006.01)

(52) U.S. Cl.
CPC ............. *H04B 1/69* (2013.01); *H04L 27/265* (2013.01); *H04L 27/2657* (2013.01); *H04B 2001/6912* (2013.01)

(58) Field of Classification Search
CPC . H04B 1/69; H04B 2001/6912; H04L 27/265; H04L 27/2657
See application file for complete search history.

(56) References Cited

U.S. PATENT DOCUMENTS

| | | | |
|---|---|---|---|
| 6,549,562 B1 | 4/2003 | Olaker et al. | |
| 6,614,853 B1 | 9/2003 | Koslar et al. | |
| 6,940,893 B1 | 9/2005 | Pinkney et al. | |
| 2004/0100897 A1* | 5/2004 | Shattil | H04L 1/04 370/206 |
| 2012/0307871 A1* | 12/2012 | Schaffner | H04L 27/103 375/139 |
| 2013/0294219 A1* | 11/2013 | Peck | H04W 72/0453 370/210 |
| 2014/0219329 A1* | 8/2014 | Seller | H03M 13/2721 375/240 |
| 2015/0270866 A1* | 9/2015 | Schaffner | H04B 1/69 375/139 |

FOREIGN PATENT DOCUMENTS

| | | |
|---|---|---|
| EP | 0952713 A2 | 10/1999 |
| EP | 2449690 | 5/2012 |
| EP | 2763321 A1 | 8/2014 |
| EP | 2767847 A1 | 8/2014 |

* cited by examiner

*Primary Examiner* — David B Lugo
(74) *Attorney, Agent, or Firm* — Blank Rome LLP

(57) ABSTRACT

A radio receiver for processing digital chirp spread-spectrum modulated signals that comprise a plurality of frequency chirps that are cyclically time-shifted replicas of a base chirp profile, said time-shifts being an encoded representation of a transmitted message. Includes a soft demapping unit that is adapted for working on fully populated as well as on partial modulation sets, and implements a timing error correction loop that acts back both in the time domain and in the frequency domain.

8 Claims, 3 Drawing Sheets

LOW COMPLEXITY, LOW POWER AND LONG RANGE RADIO RECEIVER

REFERENCE DATA

This application claims priority of European Patent Application EP16177425.2 of Jul. 1, 2016, which is hereby incorporated by reference in its entirety.

FIELD OF THE INVENTION

The present invention relates, in embodiments, with the fields of digital radio receivers and in particular with radio receivers for digitally synthesized chirp spread-spectrum signals.

DESCRIPTION OF RELATED ART

European patent application EP2449690 describes a communication system using digitally-synthesized chirp symbols as modulation, and a suitable FFT based receiver.

Chirp generation in various kinds of radiofrequency circuits is known, for example U.S. Pat. No. 6,549,562 describes a method for generating modulated chirp signal, while EP0952713 shows a synchronization process based on chirp signals.

U.S. Pat. Nos. 6,940,893 and 6,614,853, among others, describe generation and use of chirp signal by passing an impulsive signal through a dispersive filter, and communication schemes based thereupon.

Other references known in the art describe a communication system using digitally-synthesized chirp symbols as modulation, and a suitable FFT based receiver. European patent application EP2763321 describes, among others, one such modulation method in which the phase of the signal is essentially contiguous, and the chirps are embedded in data frames in such a way as to allow synchronization between the transmitter and receiver nodes, as well as determining the propagation range between them. This modulation scheme is used in the long-range LoRa™ RF technology of Semtech Corporation, and will be referred simply as 'LoRa' in the following of this document.

EP2767847 concerns a variant of the LoRa protocol that allows estimating the range between end points of a wireless link.

The processing of the chirp-modulated radio signals and reconstruction of the intended digital message present however specific technical challenges. There is in particular a need for receivers capable of detecting and correcting errors introduced in the message during its passage in the propagation channel and align their internal time and frequency reference with those at the transmitting end. An aim of the present invention is of providing a receiver capable of fulfilling these tasks within a simple architecture, a low power consumption, and with a limited component count and therefore capable of being produced at low cost and deployed in large numbers.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
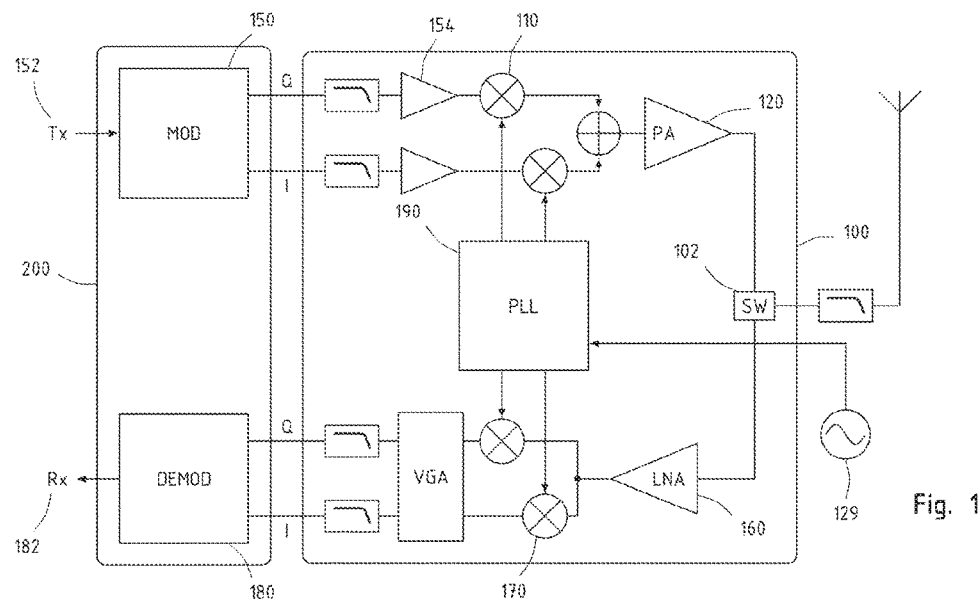
FIG. 1 shows, in schematic simplified fashion, the structure of a radio modem according to one aspect of the present invention.

Several aspects of the chirp modulation technique employed in the present invention are described in European Patent Application EP2449690, which is hereby incorporated by reference, and will be reminded here summarily. The radio transceiver that is schematically represented in FIG. 1 is a possible embodiment of the invention. The transceiver includes a baseband section 200 and a radiofrequency section 100. Since the present invention mostly relates to the receiver, the transmitter part will only be mentioned in passing: it includes a baseband modulator 150 that generates a baseband complex signal based on the digital data 152 at its input. This is then converted to the desired transmission frequency by the RF section 100, amplified by the power amplifier 120, and transmitted by the antenna.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q) comprising a series of chirps, then treated by the baseband processor 180, whose function is the reverse of that of the modulator 150, and provides a reconstructed digital signal 182.

As discussed in EP2449690, the signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile $f(t)$ of their instantaneous frequency or also by the function $\phi(t)$ defining the phase of the signal as a function of the time. Importantly, the processor 180 is arranged to process and recognize chirps having a plurality of different profiles, each corresponding to a symbol in a predetermined modulation alphabet.

Figure 2A:
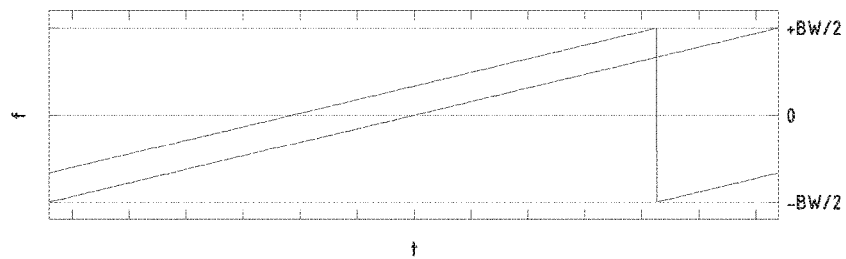
FIG. 2a plots the instantaneous frequency of a base chirp and of a modulated chirp according to one aspect of the invention. The phase of the same signals is represented in FIG. 2b, and FIG. 2c plots the real and of the complex component of the base chirp, in the time domain.
Figure 2B:
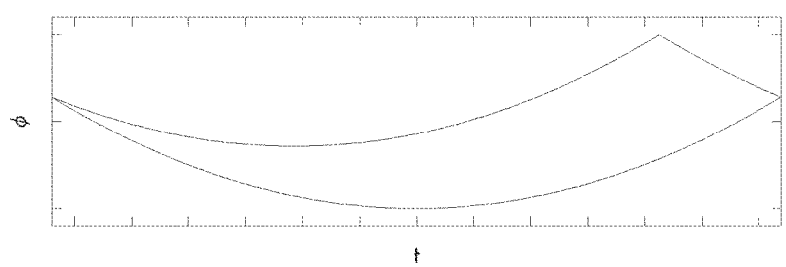

According to an important feature of the invention, the received signal Rx can comprise base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirps between the time instant $t=t_0$ at the beginning of a chirp and the instant $t=t_1$ at the end of the chirp, while FIG. 2b shows the corresponding baseband signals in the domain of time. The horizontal scale corresponds for example to a symbol and, while the plots are drawn as continuous, they in fact represent a finite number of discrete samples, in a concrete implementation. As to the vertical scales, they are normalized to the intended bandwidth or to the corresponding phase span. The phase, in particular, is represented in FIG. 2b as if it were a bounded variable, in order to better show its continuity, but it may in fact span across several revolutions in a concrete implementation.

In the example depicted, the frequency of a base chirps increases linearly from an initial value $f_0=-BW/2$, to a final value $f_1=BW/2$, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol or, otherwise said, the processor 180 needs to process a signal that comprises a plurality of frequency chirps that are cyclically time-shifted replicas of a base chirp profile, and extract a message that is encoded in the succession of said time-shifts.

Figure 2C:
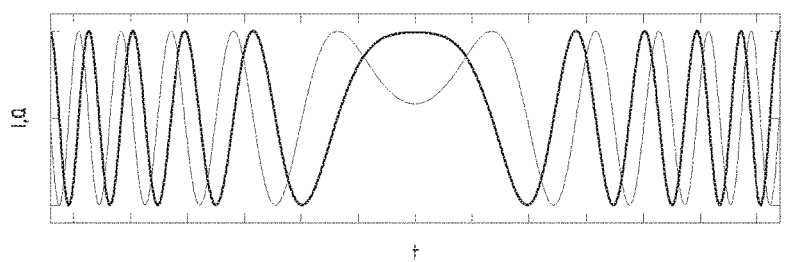

FIG. 2c is a plot of the real and imaginary component, I and Q, of the baseband signal corresponding to a base chirp, in the time domain.

As it will be clearer in the following, the signal may include also conjugate chirps that is, chirps that are complex-conjugate of the base unmodulated chirp. One can regard these as down-chirps, in which the frequency falls from a value of $f_0=BW/2$ to $f_1=-BW/2$.

Preferably, the phase of the chirps is described by a continuous function $\phi(t)$, that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function $f(t)$ is symmetrical, and the signal has inter-symbol phase continuity. As is explained in more detail by EP2449690, the structure of the signal described above allows the processor 180 in the receiver to align its time references with that of the transmitter, and the determination of the amount of cyclical shift imparted to each chirp. The operation of evaluating a time shift of a received chirp with respect to a local time reference may be referred to in the following as "dechirping", and can be carried out advantageously by a de-spreading step that involves multiplying the received chirp by a complex conjugate of a locally-generated base chirp, and a demodulation step that consists in performing a FFT of the de-spread signal. The position of the maximum of the FFT is indicative of the shift, and of the modulation value. Other manners of dechirping are however possible.

We denote with $S_j^k$ the complex values of the baseband signal in the time domain, where k is a frame index, and j indicates the sample. The combined despreading and demodulation operations produce the complex signal $X(n, k) = \mathcal{F}(S_j^k \cdot \ddot{b}_j)$, where $\ddot{b}_j$ denotes the conjugate base chirp, and $\mathcal{F}$ is the Fourier transform.

Figure 4:
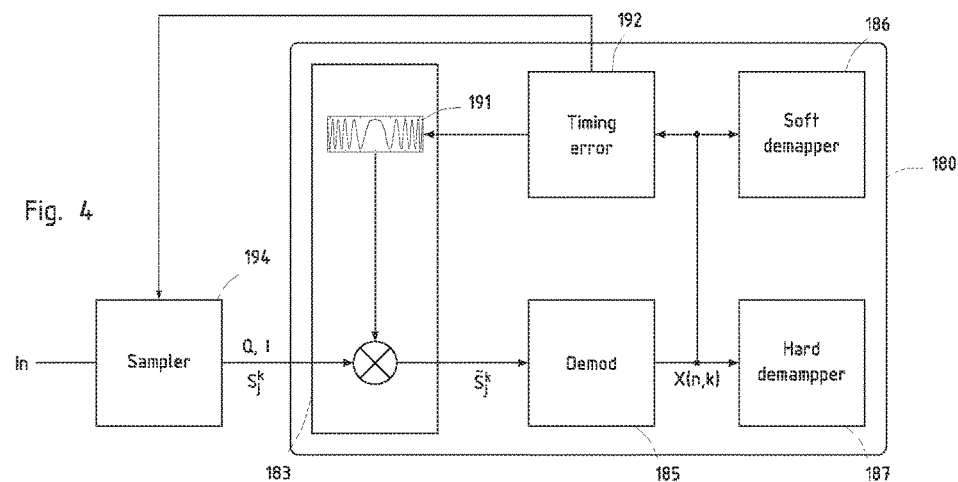
FIG. 4 illustrates schematically a possible structure, according to the invention, of a baseband processor 180 for the received signal.

These operations of de-spreading and demodulating are implemented in a despreading unit 183, respectively a demodulating unit 185 in the baseband processor 180 as represented in FIG. 4. The baseband processor is preceded by a sampling unit 194 that generates the series of samples $S_j^k$ in any suitable way. It must be understood, however that these wordings can be interpreted functionally and do not necessarily imply physically distinct and independent hardware elements. The invention comprising also variants in which the de-spreading unit and/or the demodulating unit are realized partly or in full in software, or utilize resources in common with other element of the system.

Prior to the operations of de-spreading and demodulating, the processing unit 180 must detect that a signal is present, determine the symbol boundaries, and synchronize its clock in time and frequency with that of the transmitter. These operations of detection, synchronization and demodulation are often the weakest link of the receiver and those that need more processing power, and consume more battery charge.

Thus, "cyclic shift value" may be used in the following to indicate the modulation in the time domain, and "modulation position", or "peak position" represents it in the frequency domain.

We denote with N the length of the symbol, or equivalently the spreading factor. To allow easy reception using FFT, N is preferably chosen to be a power of two. The Nyquist sampling frequency if 1/BW, and the length of a symbol is N/BW. To fix the ideas, but without limiting the invention to these specific numeric values, one can imagine that, in a possible application, BW be 1 MHz, and N equal 1024, 512, or 256. The carrier frequency may be in the 2.45 GHz IMS band. In this particular embodiment, the modulation schema of the invention could occupy the same RF band as a Bluetooth® transceiver and, possibly, reuse or share the RF parts of a Bluetooth® transceiver. The invention is not limited to this particular frequency band, however.

Hence, a modulated symbol is a cyclic shift of the base symbol, of any number between 0 and N−1. A modulation value of 0 is equivalent to the absence of modulation. Since N is a power of two, each modulated chirp can therefore be regarded as a symbol that encodes $\log_2 N$ bits in its cyclic shift can code. It is sometimes advantageous to limit the symbol constellation to a reduced set that does not to use all the theoretically possible phase shifts.

Figure 3:
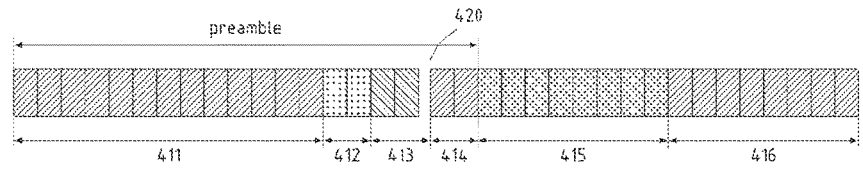
FIG. 3 represents schematically the structure of data frames exchanged between two devices in the frame of the present invention.

Preferably, the signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command. In the frame of the invention, several structures are possible for the data frame, depending inter others, on the channel condition, transmitted data or command. FIG. 3 represents schematically, a frame structures that can be employed in various aspects of the present invention.

In the presented example, the frames has a preamble including a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. By demodulating the detect sequence, the receiver is able to determine a shift amount and adapt the frequency and phase of its clock with those of the sender, thus allowing the decoding of the following data.

Detection

To lower the complexity the invention can use a non-coherent receiver, which means that the phase relationship between consecutive symbols is neither used nor tracked in the general case. There may be specific situations, however, like ranging operations, or the frequency synchronization that will be mentioned later on, in which the phase relations between symbols do play a role.

The receiver can analyse the detect sequence in an arbitrary set of windows, also overlapping. Preferably, however, the windows are such that they can be arranged in non-overlapping contiguous sets. For each non-overlapping contiguous set, the following operations are carried out:

The position of the maximum in the demodulated signal arg max$_n$ (|X(k, n)|) is saved;

An average amplitude of the signal |X(n, k)| is accumulated for each value of the frequency index k, for example by using a suitable digital IIR filter. In parallel the noise floor in |X(n, k)| is evaluated.

Detection is decided if a determined number of positions in adjacent windows are identical and if the maximum value of the average amplitude is above the noise floor by a determined, statistically significant amount.

Once detection is decided, the position of the peak that triggered it is used to align the window boundaries on the symbol boundaries. If the position is 0, no alignment is necessary; if it is 1, a shift of 1 sample is required, and so on.

Frame Synchronisation

In these examples, the detect sequence 411 is followed by frame synchronisation symbols 412 that are chirps modulated with predetermined values. To fix the ideas, let us assume that frame synchronization symbols be modulated with values 4 and 8, being it intended that other values are also possible. Frame synchronization consists in adding amplitudes of these positions with their neighbours, as follows:

$A_0(k)=|X(0,k)|+|X(SF-1,k)|+|X(1,k)|$ $A_4(k)=|X(3,k)|+|X(4,k)|+|X(5,k)|$ $A_8(k)=|X(7,k)|+|X(8,k)|+|X(9,k)|$

For each k, we compute the following (boolean-valued) decision variables:

$D1=A_8(k)+A_4(k-1)<A_4(k)+A_0(k-1)$ $D2=A_8(k)+A_4(k-1)<A_4(k)+A_0(k-1)$

If both decision variables are true, frame synchronization is achieved. It is optionally possible to form other decision variables that aim at detecting fortuitous coincidences. These may be designed to detect, for example a decrease in amplitude at the expected positions. During frame synchronization, since timing drift may prevent the alignment, a fine time tracking loop is active.

Frequency Synchronization frequency synchronisation symbols 413 that consist in one or more, preferably two chirps that are complex-conjugate of the base unmodulated chirp, hence they have an opposite slope to all other symbols. These are preferably followed by a silence 420 to allow the receiver's alignment, fine synchronisation symbols 414 that are unmodulated base chirps.

When there is no frequency error between transmitter and receiver, when the receiver is aligned on positive slope chirps, it will also be perfectly aligned to those of opposite slope. If however the time alignment on the detection symbols leaves a residual frequency mismatch, this will manifest as a window delay (or advance) proportional to the frequency error. The proportional factor is such that a frequency error $\Delta f=BW/SF$ results in an advance (or delay if the receiver is lower than the transmitter) of one sample compared to the ideal window. The overlapping portions of transmitter and receiver windows will show aligned instant frequency.

The proportional factor linking frequency error and window delay has the opposite sign for negative slope chirps. This is enough to find the frequency error by looking at the position of the peak after demodulation in received frequency synchronization symbols 213. In addition to the peak position, a phase difference between these two symbols can also be extracted and used to more precisely measure the frequency error.

Fine Synchronisation

The optionally unmodulated symbols 414 can be used for evaluate and correct a residual timing drift.

Advanced Dechirping

In the presence of both time and frequency synchronisation errors, even small, the initial phase of the received symbol is different from its final phase, and there will also be a phase discontinuity at the point where the instant chirp frequency wraps around. When the symbol is un-modulated, these two discontinuities occur at the same place. When two phases discontinuities are present in a received symbol, the Fourier transform operates on 2 sets of data with the same instant frequency, but that may be in phase opposition, or cancel in part.

If a single discontinuity is present, for instance when there is only a frequency error, the Fourier transform will still operate on coherent data, because of its cyclic nature. A phase discontinuity in the middle of a vector of constant frequency has the same effect of a discontinuity between the end and the start of the vector. If, however, the Fourier transform is operated on out of phase sets of data, the correlation peak may be duplicated, leaving a very small value on the expected bin position and two larger side peaks.

One solution to this is to compute partial FFTs on portions of symbols, preferably first half and second half independently, and then apply a non-coherent sum on the result. The FFT size is the same as before, zero padding is used. Since the source of double correlation peaks is a double phase discontinuities, the duplicated peak can only be significant on some modulated values, i.e. some potential maximum peak positions. These positions correspond to modulation values that are close to half of a symbol, which is when the two discontinuities are most separated cyclically, making almost equal length non-coherent vectors.

Preferably, the demodulation method of the invention employs either a full FFT or a non-coherent sum of partial FFT according to the bin value of the symbol. Namely, a range of bin values for which the discontinuity point of the frequency is close to the middle of the symbol is selected for demodulation by a non-coherent sum of partial FFT, while the bin values outside this range, that is those in which the frequency discontinuity is not too close to the middle of the vector, are demodulated, after dispreading, with a complete FFT.

In tests, the symbols with a bin value between zero indexes between 0 and round(N*0.4) or between round(N*0.6) and (N−1) have been demodulated by the full FFT output, while those in the remaining central interval have been demodulated based on the non-coherent sum of partial FFT. The values of 0.4 and 0.6 are not essential and in fact any suitable placed pair of values in the interval (0,1) would provide similar advantages. Preferably, however, the lower limit will be chosen larger than 0.25, and the upper limit lower than 0.75, because the non-coherent sum of partial FFTs is less accurate.

After dechirping (despreading then full FFT, or despreading then non-coherently summed partial FFTs), and after hard demodulation, a maximum bin position is determined. Here again, the same principle of partial sums can be applied, with a boundary corresponding to the demodulated value. This can be used to have better resolution in the tracking loop, for this application only a subset of bins, preferably 3, are computed. The 2 segments of the received symbol are transformed in the frequency domain independently, then the result is summed non-coherently, that is the absolute amplitudes are summed. The segments are before and after the frequency jump of the modulated chirp.

Hard and Soft Demapping

As it was already mentioned, hard demapping consist essentially in determining the position of the highest amplitude peak in the demodulated signal h(k)=arg max$_n$ (|X(k, n)|). This directly gives the value of the cyclical shift, and can be translated, for example by a suitably prepared lookup table, into hard values for all the bits that are encoded in a given symbol k. If a reduced modulation set is used, the amplitude value at a candidate position can be summed with those of its neighbours or, equivalently, the amplitude distribution |X(n, k)| can be re-binned to accommodate only the cyclical shift values that are possible in the chosen modulation set.

A soft demapping method will now be detailed: We will denote with $b_i(n)$ the value of the i-th bit in a symbol when the modulation value is n. $b_i(n)$ has values in $\{0, 1\}$ if n is a valid modulation value, and is not defined elsewhere.

The number of bits, the range in which i can vary, can be $\log_2(SF)$ for a complete modulation set, or less for a reduced modulation set. In the important case in which the valid modulation values are spaced four by four, the number of bits will be $p=\log_2(SF)-2$.

For each symbol k and for each bit I, we compute:

$$M1(k,i)=\max|X(n,k)|\{n|b_i(n)=1\}$$

$$M0(k,i)=\max|X(n,k)|\{n|b_i(n)=0\}$$

Where $\{n\ b_i(n)=1\}$ prescribes that the maximum is searched for all positions n such that the i-th bit of b(n) is equal to one and, conversely, $\{n|b_i(n)=0\}$ indicates that the search be done on those values of n such that the i-th bit of b(n) is zero.

If a reduced set is used, such that not all the position are possible, and all the possible modulation values are separated by a distance not less than three units, then M1 and M0 can be adapted to take into account also the neighbouring values, as in:

$$M_{ext}1(k,i)=\max\{|X(\mathrm{mod}((n-1),SF),k)|,|X(n,k)|,|X(\mathrm{mod}((n+1),SF),k)|\}\{n|b_i(n)=1\}$$

$$M_{ext}0(k,i)=\max\{|X(\mathrm{mod}((n-1),SF),k)|,|X(n,k)|,|X(\mathrm{mod}((n+1),SF),k)|\}\{n|b_i(n)=0\}$$

where mod(_, SF) is the modulo operation that wraps integer numbers into $\{0, 1, \ldots, SF-1\}$.

Figure 5:
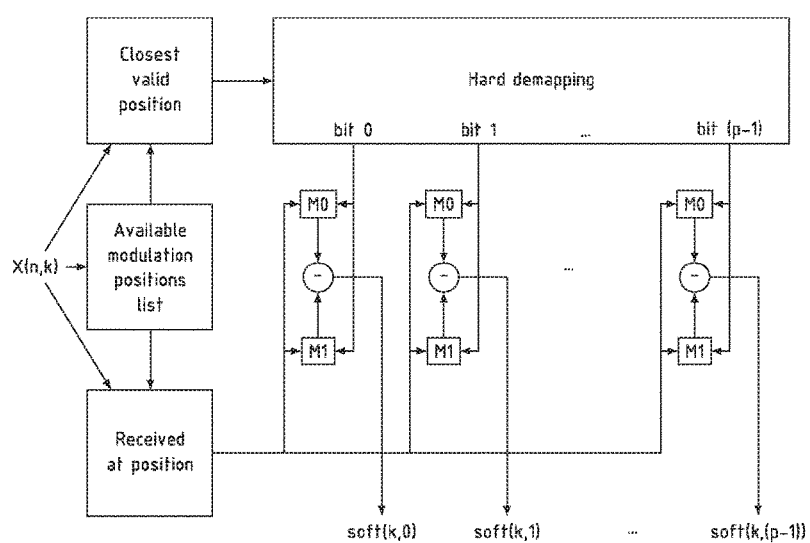
FIG. 5 illustrates schematically a soft-demapping method according to an aspect of the present invention.

FIG. 5 illustrates the soft demapping process: The algorithm consists in updating M0 and M1 (or $M_{ext}0$ and $M_{ext}1$ in the case of a reduced modulation set) for each bit, examining all the elements in a list of available modulation positions that depends on the chosen modulation set and spreading factor.

If all the modulation positions are possible (the modulation set is full), then the list has entries for all modulation positions;

If a reduced modulation set is used and at least some possible modulation positions are adjacent, then the list will also be fully populated, with entries for all the modulation positions;

Should a reduced modulation set be user, in which all possible modulation positions are separated by at least three units, than the list has entries for all the modulation positions and their neighbours, that is $$\{\mathrm{mod.pos.}\}\cup\{\mathrm{mod.pos.}+1\}\cup\{\mathrm{mod.pos.}-1\}.$$

Once computed the M0 and M1, the soft-demapping algorithm computes, for each possible symbol or bit, the difference of amplitude at two position in the Fourier-transformed signal: the soft bit i for symbol k is then given by $$\mathrm{soft}(k,i)=M1(k,i)-M0(k,i).$$

Timing Error Estimation

Demodulation consists in eliminating the carrier frequency of a complex exponential function. If timing is perfectly aligned, then the frequency will be aligned with one FFT bin. If not, it will span over several bins. There are known algorithms for estimating the accurate frequency of a complex exponential signal by looking at the content of several FFT bins. These, however, work unsatisfactorily in the case at hand, because the signal comprises, due to the cyclical shift two exponential complex signals with different phases.

In a preferred embodiment, the receiver of the invention tracks and corrects the timing error as follows:

For each received symbol, the processor first performs a hard demodulation, in the sense that it finds the position of maximum amplitude of the FFT signal. In the frame synchronization phase, only three demodulation values are possible, while during the demodulation of the data section, all the values of the used modulation set, which can be complete or incomplete can be received. If a reduced modulation set is used, the hard demodulated value of the cyclical shift will not necessarily match the position of the FFT maximum. This usually indicates a timing error greater than one sample or could be caused by a noisy channel.

Denoting with N the position of the maximum, we have, for a complete modulation set: $N=\arg\max_n$ (|X(n, k)|), while, the result for a partial modulation set is:

$$N = \underset{n}{\mathrm{argmax}}(|X(\mathrm{mod}((n-1), SF), k)| + |X(n, k)| + |X(\mathrm{mod}((n+1), SF), k)|)$$

The receiver then evaluates the timing error as $$TE_{raw}(k) = \frac{|X(\mathrm{mod}((N-1), SF), k)| + |X(\mathrm{mod}((N+1), SF), k)|}{|X(N, k)|}$$

Figure 6:
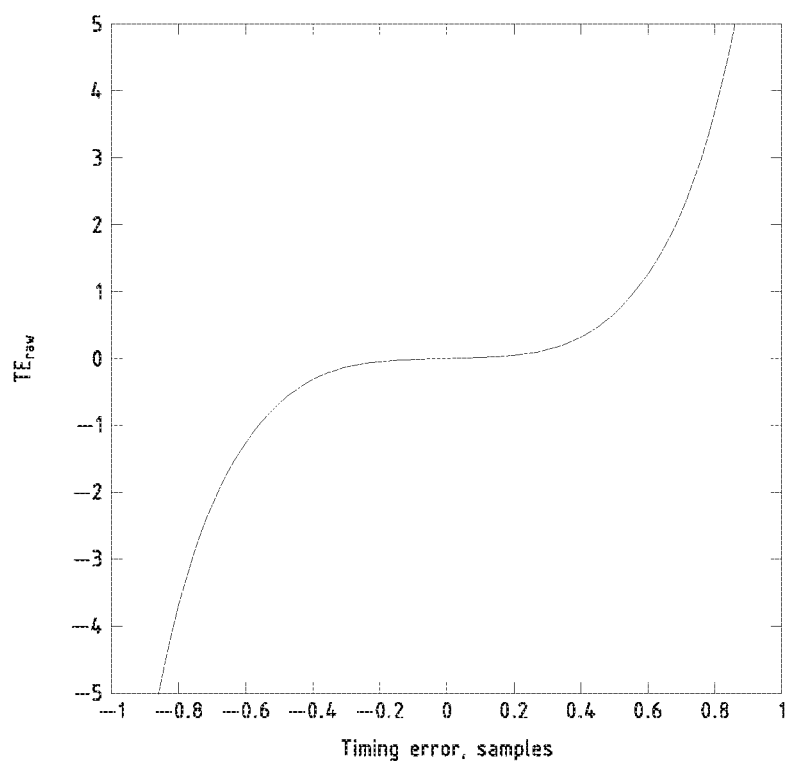
FIG. 6 is a plot of a function of a measure of the timing error.

Neglecting noise, the $TE_{raw}$ is a function of the actual timing error that can be calculated or measured, and is for example to the function plotted in FIG. 6. The receiver is arranged for determining a hard-demodulated cyclical shift N, computing the ratio $TE_{raw}$ between the summed amplitudes of the FFT signal at two bins adjacent to the N position, and the amplitude at the N position. The actual timing error can then be obtained from $TE_{raw}$ by inverting the non-linear function of FIG. 6. The $TE_{raw}$ is defined as a function of the actual timing error in the domain ±1 sample. When using a full modulation set, the timing error is limited to ±½ sample, so the function above is sufficient. If a reduced modulation set is employed, the timing error can exceed one sample. In such cases one can estimate the integer part by looking at the position of the maximum, relative to the hard demodulated value, then compute $TE_{raw}$(k) centred on the maximum position.

It is noted that $TE_{raw}$(k) has an horizontal inflexion point at the origin. Conversely, its inverse has a vertical tangent and tends to amplify noise and random fluctuations when applied to very small errors. This may lead to an instability of the error tracking loop.

A way to avoid this limitation is to interpolate the FFT output to get out of the 'dead zone' in the proximity of the origin. This device, however, is best suited to coherent receivers, and has been found that non-coherent receivers in most cases perform better without FFT interpolation.

Double Stage Fractional Sampling

Fractional sampling is mainly applied in the time domain, inside the decimation chain of the sampling unit. Due to the architecture of the receiver, however, and since symbol k is processed at the same time while symbol (k+1) is sampled, the fractional timing can be updated in the decimation chain only for symbol (k+2).

Preferably, the receiver of the invention is arranged to apply fractional sampling during the de-chirping process, and this is achieved by adjusting the starting frequency of the local chirp replica. This takes advantage of the time-frequency equivalency of chirps, such that a small time misalignment can be compensated by a proportionally small frequency offset, in many cases. Since the equivalence is not complete, it is advantageous to correct the timing error with both systems: a timing shift in the time domain, and a frequency shift of the local chirp replica in the despreading stage.

FIG. 4 illustrates a possible variant of the invention in which the signal processor 180 includes a timing error estimation 192 unit that is arranged for determining a timing error by inverting a non-linear $TE_{raw}$ function, as explained above, and retroacting the correction to the local chirp generator 191, and to the decimator stages, in the sampling unit 194.

One important source of sampling error is the difference of transmitter's and receiver's time reference. For a given frame, this sampling error can be considered systematic, or constant, because the time references' short term variations are small. Usually, the time reference is a crystal oscillator which is also used to derive the carrier frequency. This means that frequency synchronisation provides an estimate of this sampling drift error.

The compensation of this sampling drift error occurs at two levels: first, the estimated drift is integrated and a compensation value is computed for each new symbol. This compensation value is part of the timing error estimation unit 192.

The second sampling drift error compensation occurs within a symbol, to align last samples with first samples. This can be realised with a variable time domain interpolator but, preferably, it is achieved in a simper manner by adjusting the local replica of the base chirp. The adjustment consists in a small change of its frequency slope: instead of spanning the full bandwidth within exactly one symbol period, the slope is adjusted to span the full bandwidth within a slightly different duration, adapted in consideration of the frequency mismatch between transmitter and receiver. To make an example, if the crystal oscillator difference is +40 ppm, receiver's frequency being higher than transmitter's, and if the symbol length is 4096 samples, the receiver will use a slope corresponding to the ratio of the full bandwidth over a period of 4096+0.16 samples instead of 4096 or, in other words, the slope corresponding to the ratio of the full bandwidth over the length of a symbol at the transmitter. This compensation helps demodulation, and timing tracking.

The invention claimed is:

1. A radio receiver for processing digital chirp spread-spectrum modulated signals that comprise a plurality of frequency chirps that are cyclically time-shifted replicas of a base chirp profile, said time-shifts being an encoded representation of a transmitted message, wherein the receiver includes a soft demapping unit arranged to determine, for each received chirp of said plurality of frequency chirps, a plurality of soft values representing probability of possible symbols or bits in the transmitted message., including a sampling unit that provides a series of digital samples of the received frequency chirps, a de-spreading unit that is arranged for multiplying the sampled chirps with a complex conjugate of a local replica of the base chirp, a demodulating unit arranged for performing a Fourier transform of samples provided by the de-spreading unit, and wherein the soft demapping unit is arranged to compute, for each possible symbol or bit, the difference of amplitude at two position in the Fourier-transformed signal.

2. The receiver of claim 1, wherein the demodulating unit is arranged to partition the received symbols into sub-symbols and compute for each symbol a full Fourier transform and a plurality of partial Fourier transforms on said sub-symbols, and for selecting either a peak value of the full Fourier transform or a peak value of a non-coherent sum of the partial transforms, based on the received symbols' bin index.

3. The receiver of claim 1, further comprising a timing error estimation unit that is operatively arranged to compare a peak amplitude in the Fourier-transformed signal with amplitudes in neighbouring Fourier bins and extract an amplitude difference therefrom, and derive a timing error by evaluating a non-linear function of the amplitude difference.

4. The receiver of claim 2, further comprising a timing error estimation unit that is operatively arranged to compare a peak amplitude in the Fourier-transformed signal with amplitudes in neighbouring Fourier bins and extract an amplitude difference therefrom, and derive a timing error by evaluating a non-linear function of the amplitude difference.

5. The receiver of claim 1, wherein the demodulating unit is arranged to partition the received symbols into sub-symbols and compute for each symbol a full Fourier transform and a plurality of partial Fourier transforms on said sub-symbols, and for selecting either a peak value of the full Fourier transform or a peak value of a non-coherent sum of the partial transforms, based on whether the received symbols' demodulated value falls within a determined boundary.

6. The receiver of claim 2, wherein the demodulating unit is arranged to partition the received symbols into sub-symbols and compute for each symbol a full Fourier transform and a plurality of partial Fourier transforms on said sub-symbols, and for selecting either a peak value of the full Fourier transform or a peak value of a non-coherent sum of the partial transforms, based on whether the received symbols' demodulated value falls within a determined boundary.

7. The receiver of claim 3, further arranged to correct the timing error by introducing an offset in the frequency of the local replica of the base chirp based on said timing error estimated by the timing error estimation unit.

8. The receiver of claim 3, further arranged to correct a sampling drift error by introducing an offset in time/frequency slope of the local replica of the base chirp based on the frequency error estimation.

* * * * *